Figure 1:
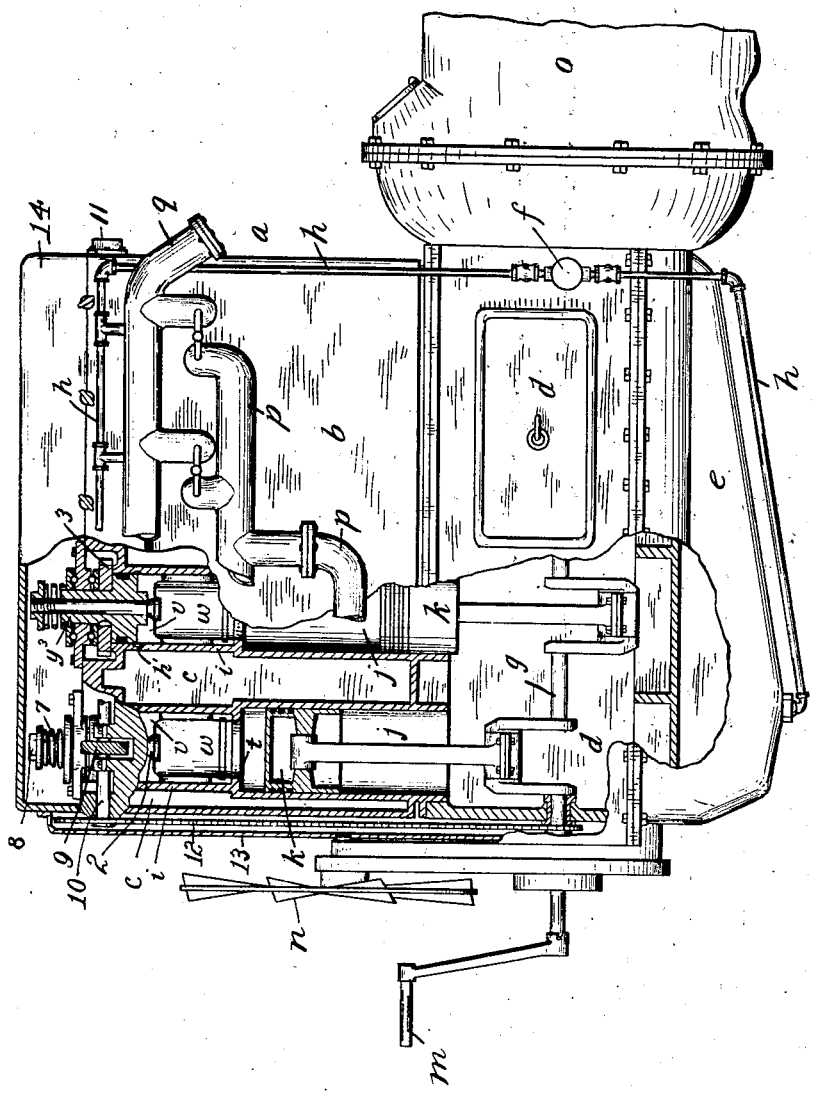

W. A. GILL.
ROTARY VALVE FOR INTERNAL COMBUSTION ENGINES.
APPLICATION FILED NOV. 6, 1913.

1,130,896.

Patented Mar. 9, 1915.
3 SHEETS—SHEET 1.

WITNESSES:
Wm. F. Schmitt
Cecil Long

INVENTOR
William A. Gill.
BY
T. J. Geisler
ATTORNEY

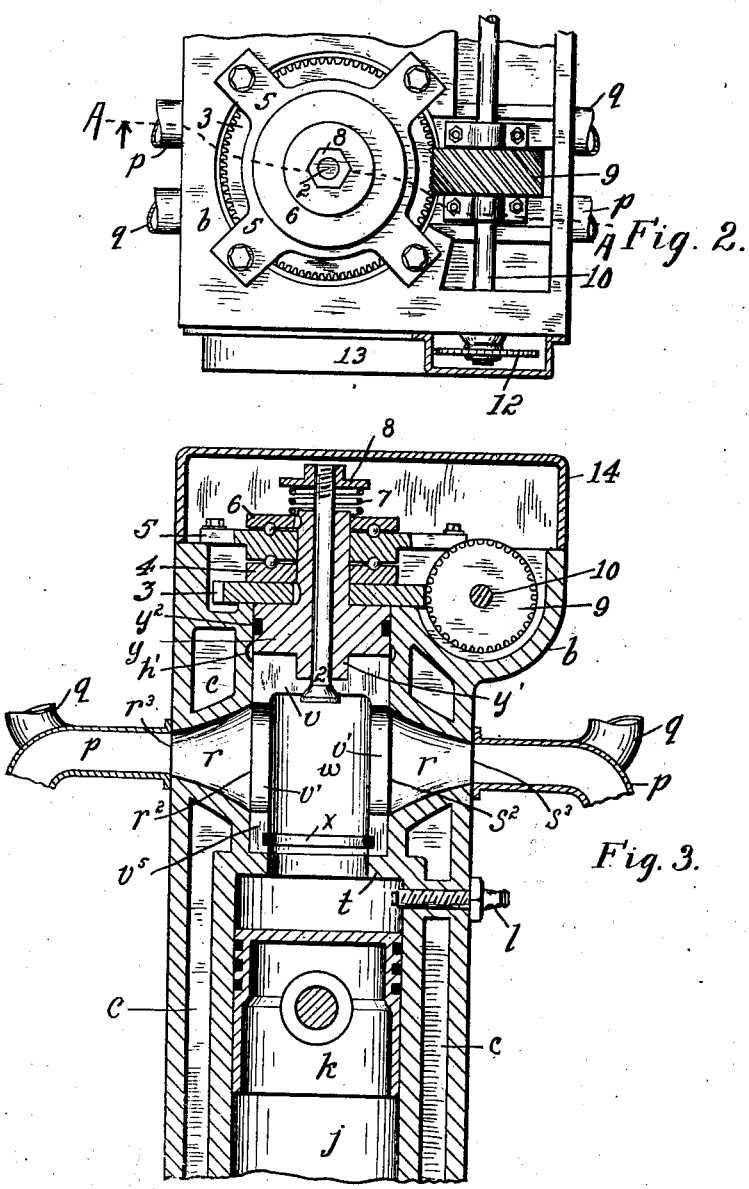

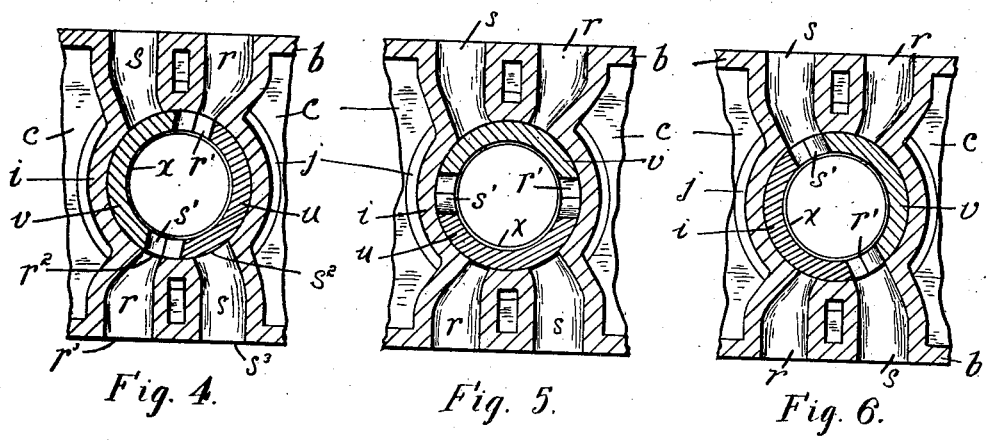
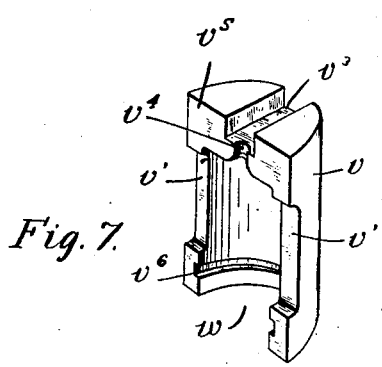
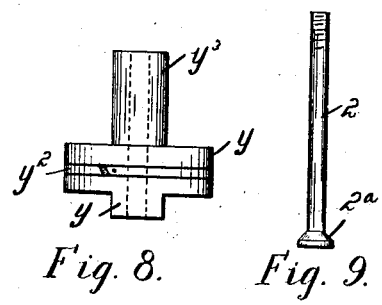
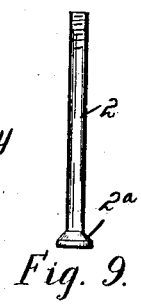
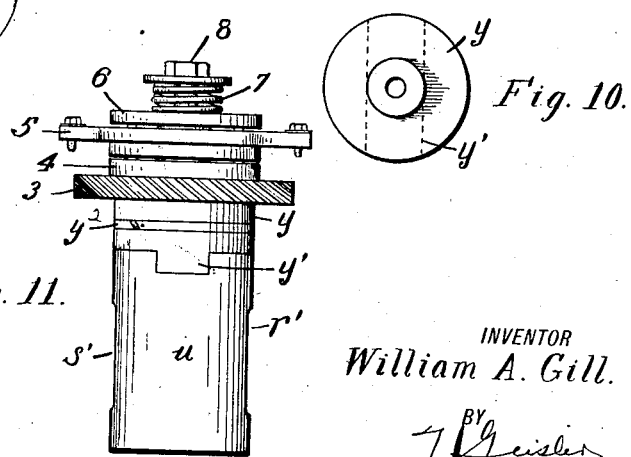
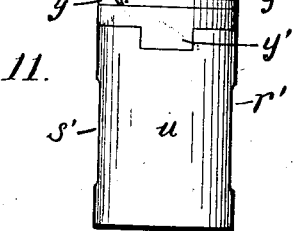

UNITED STATES PATENT OFFICE.

WILLIAM A. GILL, OF PORTLAND, OREGON, ASSIGNOR TO GILL-COOK VALVE CO., OF PORTLAND, OREGON, A CORPORATION OF OREGON.

ROTARY VALVE FOR INTERNAL-COMBUSTION ENGINES.

1,130,896.     Specification of Letters Patent.     Patented Mar. 9, 1915.

Application filed November 6, 1913. Serial No. 799,535.

*To all whom it may concern:*

Be it known that I, WILLIAM A. GILL, a citizen of the United States, and a resident of the city of Portland, in the county of Multnomah, State of Oregon, have invented a new and useful Improvement in Rotary Valves for Internal-Combustion Engines, of which the following is a specification.

My invention relates to the valve mechanism of gas engines, especially of four-cycle engines, and one of the main objects of my invention is to provide a valve which will remain fluid-tight in service, without depending on packing rings. I attain this object by the combination of a cylindrical valve chamber and a hollow rotary valve therein made of a plurality (preferably two) of segmental sections having longitudinal abutting faces; the interior of the valve being in direct communication with the combustion chamber, and the driving fluid being conducted through said valve; thus utilizing the pressure of the fluid in the valve as a means for holding the valve parts in gas-tight relation with the valve seat in the chamber. It is evident that the opposed faces of the valve parts and the seat will maintain each other true, though worn away in service. I find it convenient to make the axis of my valve approximately co-incident with the axis of the combustion chamber.

An incidental object of my invention is to so construct the valve that it may be easily and quickly removed from the cylinder. Furthermore, the intake and exhaust ports are made in duplex, and the manifolds of the intake ports are so arranged that they may be fed from one or two carbureters.

In the accompanying drawings: Figure 1 is a side elevation of a four-cylinder four-cycle engine embodying my invention; a portion of the engine case is broken away so as to show the valve and its driving connections; Fig. 2 is a plan view of the front portion of the engine, the top casing having been removed; this view shows the means for driving the rotary valve, and also the "star" shaped head which holds the valve in place, at the same time permitting a complete inspection of the valve gear-drive; Fig. 3 is a vertical section of the engine taken approximately on the line A—A of Fig. 2; one-half of the valve is shown in this view, and is so positioned that its ports are in related connection with the intake ports; Fig. 4 is a horizontal section of one of the engine cylinders, showing the valve positioned during the intake stroke of the engine; Fig. 5 is a similar view showing the valve as positioned during the compression stroke of the engine; Fig. 6 is another view showing the valve positioned during the exhaust stroke of the engine; Fig. 7 is a perspective view of one of the sections of the valve; Fig. 8 is a side elevation of the piston-like driving head of the valve; Fig. 9 is an elevation of the pin which holds the valve and driving head firmly together, at the same time tending to spread the sections of the valve away from each other; Fig. 10 is a plan view of the driving head shown in Fig. 8; and Fig. 11 is an elevation of the valve, driving head, and thrust bearings which may be entirely removed from the engine by the removal of the studs shown in this view.

I will describe my invention as applied to the valve mechanism of a four-cylinder engine. In Fig. 1, $a$ represents any form of four-cylinder, four-cycle engine, but it is to be understood that my rotary valve may be used in connection with any type of engine wherein rotary valves are practical. In describing my invention, I shall refer briefly to the parts of the engine shown, and describe in detail only the valve mechanism. The engine casing is indicated by $b$, the usual water jackets by $c$, and the crank case by $d$. The oil reservoir $e$ is bolted onto the crank case $d$, and the oil pump $f$, operated from the engine shaft $g$, pumps the lubricating oil up through the oil pipes $h$ into the oil grooves $h'$ of the valve chamber $i$. The cylinders $j$, pistons $k$, and spark plugs $l$ are all of the usual construction, as are also the crank handle $m$ and fan $n$. The clutch case, $o$, is shown at the right end of Fig. 1, and the intake and exhaust manifolds, $p$, $q$, connect with the intake and the exhaust ports $r$, $s$. The ports and manifolds are made in duplex, being the same on either side of the engine; such arrangement I claim as new with respect to the usual construction of gas engines. Furthermore, the intake and exhaust ports change from long slot-like apertures $r^2$, $s^2$ in the walls of the valve chambers to circular openings $r^3$, $s^3$ at the exterior of the engine casing. See Figs. 3 and 4.

The valve chamber, $i$, is of cylindrical form, of slightly lesser diameter than the cylinder $j$, and in approximate axial alinement therewith. The lower end of said valve chamber is provided with an annular shoulder $t$, which forms a seat for the lower end of the valve $u$. Oil grooves $h'$ in the valve chamber $i$ afford means for lubricating the valves. The valve, $u$, is rotatably mounted in the chamber $i$, the details of said valve being as follows: Two approximately semi-cylindrical sections as $v$ (one of which is shown perspectively in Fig. 7) are arranged with their inner faces $v^5$ placed in contact, inside the valve chamber. Each section $v$ is cored out so as to form a cup-shaped chamber $w$, open at the bottom and closed at the top. A peripheral groove $v^6$ on the interior, at the bottom, of the valve sections, $v$, forms a seat for an expansion spring ring $x$, the latter tending to exert a constant outward pressure, thereby holding said valve sections on their seats. Each valve section is made with approximately half of the port openings as shown at $v'$ in Fig. 7, so that when the valve sections are assembled the valve, $u$, will have ports $r'$, $s'$. See Figs. 4 and 11.

The upper end of each of the valve sections, $v$, is provided with a slot, as shown at $v^3$ in Fig. 7, and in the lower end of such slot is formed one-half of a cylindrical hole $v^4$, the lower end of which is tapered outward. When the valve sections are assembled, the slots $v^3$ will form a seat for a spline $y'$ and through the hole $v^4$ extends the binding pin 2. See Figs. 3 and 9. The lower end of the binding pin 2 is formed with a tapered head, so that when the pin is drawn up tightly such head will act as a wedge whereby the valve sections will be relatively forced apart and against their seat.

The piston valve head $y$ (see Figs. 3, 8 and 10) is seated on the valve sections, and an expansion ring $y^2$ provides a gas-tight fit between said head and the walls of the valve chamber. The head $y$ is connected to the driving means, the spline $y'$ forming the driving connection. Said head $y$ is made with a cylindrical portion $y^3$, of reduced diameter. The binding pin 2 extends through the head $y$. A helical gear, 3, is keyed onto the upper end of the head $y$. A thrust bearing plate 4 separates the gear 3 from the star-plate 5, the latter being bolted to the upper end of the engine casing; see Figs. 2 and 3. An upper thrust bearing plate 6 is keyed to the upper end of the head $y$ above the plate 5. A coil-spring 7, on the projecting end of the binding pin 2, forms a resilient seat for the adjustable nut 8, the latter threaded in said end of the pin 2. Helical gears 9, mounted on a longitudinal shaft 10, mesh with and drive the gear 3 and thereby the rotary valve at a two to one, or other convenient speed.

The end thrust of the shaft 10 is taken care of by thrust bearings at the end of the engine, as indicated at 11 in Fig. 1. The forward end of the shaft 10 projects beyond the engine casing and is driven from the engine shaft by some convenient means, e. g., a "two to one" chain, as shown at 12 in Figs. 1 and 2. A case 13 incloses the chain drive, and the top 14 incloses the upper portion of the engine. It is to be noted that the driving connections between the engine shaft and the valve are adapted to drive the latter with a rotary motion and at a speed of one revolution to every four of the former.

In designing my valve, it is necessary that the cubical capacity of the interior of the valve be figured as a part of the compression space permissible in the particular type of motor to which the valve is to be applied. If this rule is not followed the engine may still run but will not run efficiently. Since experience has formulated a rule governing the proportional circumferential width of the ports in a rotary valve for gas engines of the four-cycle type, in other words, limiting the width of said ports, and necessitating the increasing of the length thereof in order to increase their area, and since I desire to avoid increasing the diameter of my valve, I provide the valve chamber with duplex inlet and outlet ports and connect such ports with the manifolds, thereby reducing the required length of the ports of my valve to approximately half what it would otherwise have to be.

I claim:

1. In a gas engine, valve mechanism comprising a cylindrical valve chamber and a hollow rotary valve therein made of a plurality of detached segmental sections having longitudinal abutting faces, the interior of the valve communicating with the combustion chamber, and the driving fluid being conducted through said valve and the pressure of such fluid being thereby utilized to hold said valve parts in fluid-tight relation with the valve seat, the interior of the valve constituting a part of and being made proportional to the compression space of the engine.

2. In a gas engine, valve mechanism comprising a cylindrical valve chamber and a cup-shape valve therein made of a plurality of detached segmental sections having longitudinal abutting faces, the open end of the interior of the valve communicating with the combustion chamber, and the driving fluid being conducted through said valve and the pressure of such fluid being thereby utilized to hold said valve parts in fluid-tight relation with the valve seat, the interior of the valve constituting a part of and being made proportional to the compression space of the engine.

3. In a gas engine, valve mechanism comprising a cylindrical valve chamber and a hollow rotary valve therein made of a plurality of detached segmental sections having longitudinal abutting faces, the interior of the valve communicating with the combustion chamber, and the driving fluid being conducted through said valve and the pressure of such fluid being thereby utilized to hold said valve parts in fluid-tight relation with the valve seat; a thrust bearing for the inner end of the valve; and means holding the valve against said bearing.

4. In a gas engine, valve mechanism comprising a cylindrical valve chamber and a hollow rotary valve therein made of a plurality of detached segmental sections having longitudinal abutting faces, the interior of the valve communicating with the combustion chamber, and the driving fluid being conducted through said valve and the pressure of such fluid being thereby utilized to hold said valve parts in fluid-tight relation with the valve seat; a thrust bearing for the inner end of the valve; yielding resilient means holding the valve against said bearing; and means holding the valve sections to their seat portions.

5. In a gas engine, valve mechanism comprising a cylindrical valve chamber and a hollow rotary valve therein made of a plurality of detached segmental sections having longitudinal abutting faces, the interior of the valve communicating with the combustion chamber, and the driving fluid being conducted through said valve and the pressure of such fluid being thereby utilized to hold said valve parts in fluid-tight relation with the valve seat; a thrust bearing for the inner end of the valve; yielding resilient means holding the valve against said bearing; and means holding the valve sections to their seat portions, part of such means being included in said means yieldingly holding the valve to the thrust bearing.

6. In a gas engine, valve mechanism comprising a cylindrical valve chamber and a hollow rotary valve therein made of a plurality of detached segmental sections having longitudinal abutting faces, the interior of the valve communicating with the combustion chamber, and the driving fluid being conducted through said valve and the pressure of such fluid being thereby utilized to hold said valve parts in fluid-tight relation with the valve seat; a thrust bearing for the inner end of the valve; means holding the valve against said bearing; other means adapted to thrust the inner end of the valve parts against the valve seat; and means in the open end of the valve for thrusting them against the valve seat.

7. In a gas engine, valve mechanism comprising a cylindrical valve chamber and a hollow rotary valve therein made of a plurality of detached segmental sections having longitudinal abutting faces, the interior of the valve communicating with the combustion chamber, and the driving fluid being conducted through said valve and the pressure of such fluid being thereby utilized to hold said valve parts in fluid-tight relation with the valve seat; a thrust bearing for the inner end of the valve; means holding the valve against said bearing; other means, included in said holding means, adapted to thrust the inner end of the valve parts against the valve seat; and means in the open end of the valve for thrusting them against the valve seat.

8. In a gas engine, valve mechanism comprising a cylindrical valve chamber and a hollow rotary valve therein made of a plurality of detached segmental sections having longitudinal abutting faces, the interior of the valve communicating with the combustion chamber, and the driving fluid being conducted through said valve and the pressure of such fluid being thereby utilized to hold said valve parts in fluid-tight relation with the valve seat, the interior of the valve constituting a part of and being made proportional to the compression space of the engine; a thrust bearing for the inner end of the valve; and means holding the valve against said bearing.

9. In a gas engine, valve mechanism comprising a cylindrical valve chamber and a hollow rotary valve therein made of a plurality of detached segmental sections having longitudinal abutting faces, the interior of the valve communicating with the combustion chamber, and the driving fluid being conducted through said valve and the pressure of such fluid being thereby utilized to hold said valve parts in fluid-tight relation with the valve seat, the interior of the valve constituting a part of and being made proportional to the compression space of the engine; a thrust bearing for the inner end of the valve; means holding the valve against said bearing; other means adapted to thrust the inner end of the valve parts against the valve seat; and means in the open end of the valve for thrusting them against the valve seat.

10. In a gas engine, valve mechanism comprising a cylindrical valve chamber and a cup-shape valve therein made of a plurality of detached segmental sections having longitudinal abutting faces, the open end of the interior of the valve communicating with the combustion chamber, and the driving fluid being conducted through said valve and the pressure of such fluid being thereby utilized to hold said valve parts in fluid-tight relation with the valve seat, the interior of the valve constituting a part of and being made proportional to the compression space of the engine; a thrust bearing for the inner end of the valve; and means holding the valve against said bearing.

11. In a gas engine, valve mechanism comprising a cylindrical valve chamber and a cup-shape valve therein made of a plurality of detached segmental sections having longitudinal abutting faces, the open end of the interior of the valve communicating with the combustion chamber, and the driving fluid being conducted through said valve and the pressure of such fluid being thereby utilized to hold said valve parts in fluid-tight relation with the valve seat, the interior of the valve constituting a part of and being made proportional to the compression space of the engine; a thrust bearing for the inner end of the valve; means holding the valve against said bearing; other means adapted to thrust the inner end of the valve parts against the valve seat; and means in the open end of the valve for thrusting them against the valve seat.

12. In a gas engine, valve mechanism comprising a cylindrical valve chamber and a hollow rotary valve therein made of a plurality of detached segmental sections having longitudinal abutting faces, the interior of the valve communicating with the combustion chamber, and the driving fluid being conducted through said valve and the pressure of such fluid being thereby utilized to hold said valve parts in fluid-tight relation with the valve seat; a piston head in the valve chamber on the inner end of said valve parts, a driving connection between such head and said valve parts; means for driving said head; a bearing for the valve head, a rod extending longitudinally through such bearing; a spring element tending to move the rod outward; a connection between the inner end of said rod and the inner end of said valve parts, and means therewith included adapted to cause the outward movement of the rod to thrust the inner end of the valve parts against the valve seat.

13. In a gas engine, valve mechanism comprising a cylindrical valve chamber and a hollow rotary valve therein made of a plurality of detached segmental sections having longitudinal abutting faces, the interior of the valve communicating with the combustion chamber, and the driving fluid being conducted through said valve and the pressure of such fluid being thereby utilized to hold said valve parts in fluid-tight relation with the valve seat; a piston head in the valve chamber on the inner end of said valve parts, a driving connection between such head and said valve parts; means for driving said head; a bearing for the valve head, a rod extending longitudinally through such bearing; a spring element tending to move the rod outward; and a conical head on the inner end of the rod and a corresponding seat therefor in the inner end of said valve parts whereby the outward movement of the rod thrusts the inner ends of said valve parts against the valve seat.

14. In a gas engine, valve mechanism comprising a cylindrical valve chamber and a cup-shape valve therein made of a plurality of detached segmental sections having longitudinal abutting faces, the open end of the interior of the valve communicating with the combustion chamber, and the driving fluid being conducted through said valve and the pressure of such fluid being thereby utilized to hold said valve parts in fluid-tight relation with the valve seat, the interior of the valve constituting a part of and being made proportional to the compression space of the engine; a piston head in the valve chamber on the inner end of said valve parts, a driving connection between such head and said valve parts; means for driving said head; a bearing for the valve head, a rod extending longitudinally through such bearing; a spring element tending to move the rod outward; a connection between the inner end of said rod and the inner end of said valve parts, and means therewith included adapted to cause the outward movement of the rod to thrust the inner end of the valve parts against the valve seat.

15. In a gas engine, valve mechanism comprising a cylindrical valve chamber and a cup-shaped valve therein made of a plurality of detached segmental sections having longitudinal abutting faces, the open end of the interior of the valve communicating with the combustion chamber, and the driving fluid being conducted through said valve and the pressure of such fluid being thereby utilized to hold said valve parts in fluid-tight relation with the valve seat; a piston head in the valve chamber on the inner end of said valve parts, and a driving connection between such head and said valve parts.

16. In a gas engine, valve mechanism comprising a cylindrical valve chamber and a cup-shaped valve therein made of a plurality of detached segmental sections having longitudinal abutting faces, the open end of the interior of the valve communicating with the combustion chamber, and the driving fluid being conducted through said valve and the pressure of such fluid being thereby utilized to hold said valve parts in fluid-tight relation with the valve seat; a piston head in the valve chamber on the inner end of said valve parts; a driving connection between such head and said valve parts; a bearing for the valve head; and flexible means holding the valve against said piston head.

17. In a gas engine, valve mechanism comprising a cylindrical valve chamber and a valve therein made of a plurality of detached segmental sections having longitudinal abutting faces, the open end of the interior valve communicating with the combustion chamber of the engine, and the driving fluid being conducted through said valve, and the pressure of such fluid being thereby utilized to hold said valve parts in fluid-tight relation with the valve seat, a piston in the valve chamber on the inner end of said valve parts, a thrust bearing for the piston, and resilient means connecting the valve and the piston to said thrust bearing.

18. In a gas engine, valve mechanism comprising a cylindrical valve chamber and a valve therein made of a plurality of detached segmental sections having longitudinal abutting faces, the open end of the interior valve communicating with the combustion chamber of the engine, and the driving fluid being conducted through said valve, and the pressure of such fluid being thereby utilized to hold said valve parts in fluid-tight relation with the valve seat, a piston in the valve chamber, such piston removably connected with said valve, a thrust bearing for the piston, and resilient means connecting the valve and the piston to said thrust bearing.

19. In a gas engine, valve mechanism comprising a cylindrical valve chamber and a valve therein made of a plurality of detached segmental sections having longitudinal abutting faces, the open end of the interior valve communicating with the combustion chamber of the engine, and the driving fluid being conducted through said valve, and the pressure of such fluid being thereby utilized to hold said valve parts in fluid-tight relation with the valve seat, a piston in the valve chamber on the inner end of said valve parts, a thrust bearing for the piston, resilient means connecting the valve and the piston to said thrust bearing, and means for driving the piston.

20. In a gas engine, valve mechanism comprising a cylindrical valve chamber and a valve therein made of a plurality of detached segmental sections having longitudinal abutting faces, the open end of the interior valve communicating with the combustion chamber of the engine, and the driving fluid being conducted through said valve, and the pressure of such fluid being thereby utilized to hold said valve parts in fluid-tight relation with the valve seat, a piston in the valve chamber, such piston removably connected with said valve, a thrust bearing for the piston, resilient means connecting the valve and the piston to said thrust bearing, and means for driving the piston.

WILLIAM A. GILL.

Witnesses:
 Wm. C. Schmitt,
 Cecil Long.

Copies of this patent may be obtained for five cents each, by addressing the "Commissioner of Patents, Washington, D. C."